US010539759B2

(12) United States Patent
Wu et al.

(10) Patent No.: US 10,539,759 B2
(45) Date of Patent: Jan. 21, 2020

(54) OPTICAL SYSTEM

(71) Applicant: TDK TAIWAN CORP., Taoyuan (TW)

(72) Inventors: Fu-Yuan Wu, Taoyuan (TW);
Kuo-Chun Kao, Taoyuan (TW);
Nai-Wen Hsu, Taoyuan (TW);
Shih-Ting Huang, Taoyuan (TW);
Shao-Chung Chang, Taoyuan (TW);
Sin-Jhong Song, Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 0 days.

(21) Appl. No.: 16/512,701

(22) Filed: Jul. 16, 2019

(65) Prior Publication Data

US 2019/0339477 A1  Nov. 7, 2019

Related U.S. Application Data

(63) Continuation of application No. 15/650,156, filed on Jul. 14, 2017, now Pat. No. 10,416,409.

(Continued)

(30) Foreign Application Priority Data

Jun. 26, 2017 (CN) .......................... 2017 1 0494178

(51) Int. Cl.
*G02B 15/14* (2006.01)
*G02B 7/02* (2006.01)
(Continued)

(52) U.S. Cl.
CPC ............. *G02B 7/023* (2013.01); *G02B 7/021* (2013.01); *G02B 7/04* (2013.01); *G03B 3/10* (2013.01);
(Continued)

(58) Field of Classification Search
CPC ..................................................... G02B 7/023
(Continued)

(56) References Cited

U.S. PATENT DOCUMENTS

2015/0316744 A1  11/2015  Chen
2018/0031860 A1*  2/2018  Bachar ................. G02B 13/003

FOREIGN PATENT DOCUMENTS

CN  203933331 U  11/2014
CN  105024516 A  11/2015

* cited by examiner

*Primary Examiner* — James C. Jones
(74) *Attorney, Agent, or Firm* — Muncy, Geissler, Olds & Lowe, P.C.

(57) ABSTRACT

An optical system includes a base, a first lens driving module, and a second lens driving module. The first lens driving module includes a first lens holder, a first magnet, and a first coil. The first lens holder is configured to hold a first optical element. The first coil corresponding to the first magnet is configured to drive the first lens holder to move relative to the base. The second lens driving module includes a second lens holder, a second magnet, and a second coil. The second lens holder is configured to hold a second optical element. The second coil corresponding to the second magnet is configured to drive the second lens holder to move relative to the base. The first magnet is disposed between the first and second lens holders, and no other magnet is disposed between the first and second lens holders except the first magnet.

20 Claims, 7 Drawing Sheets

Related U.S. Application Data

(60) Provisional application No. 62/405,450, filed on Oct. 7, 2016.

(51) Int. Cl.
*G03B 13/36* (2006.01)
*G02B 7/04* (2006.01)
*G03B 5/00* (2006.01)
*G03B 3/10* (2006.01)

(52) U.S. Cl.
CPC ............... *G03B 5/00* (2013.01); *G03B 13/36* (2013.01); *G03B 2205/0069* (2013.01)

(58) Field of Classification Search
USPC .......................................................... 359/691
See application file for complete search history.

OPTICAL SYSTEM

CROSS REFERENCE TO RELATED APPLICATIONS

This application is a Continuation Application of the U.S. patent application Ser. No. 15/650,156 filed on Jul. 14, 2017, which claims the benefit of U.S. Provisional Application No. 62/405,450 filed on Oct. 7, 2016 and China Patent Application No. 201710494178.X, filed Jun. 26, 2017, the entirety of which is incorporated by references herein.

BACKGROUND OF THE DISCLOSURE

Field of the Disclosure

The present disclosure relates to an optical system, and more particularly to an optical system whose two lenses are driven by an electromagnetic force.

Description of the Related Art

As technology has progressed, many kinds of electronic devices, such as tablet computers and smart phones, have developed the functionality of digital photography or video recording. A user can operate the electronic device to capture various images using the camera module of the electronic device, so that electronic devices with a camera module have become popular.

Recently, a camera module having two lenses has gradually become popular. However, the two lens driving modules that are used for driving the two lenses in current dual-lens camera modules are usually close to each other, so that magnetic interference between the magnets of different lens driving modules is generated, causing the focus speed and accuracy of the lens to be affected.

Therefore, how to design an optical system capable of preventing magnetic interference between different lens driving modules is an important subject for further research and development.

BRIEF SUMMARY OF THE DISCLOSURE

Accordingly, one objective of the present disclosure is to provide an optical system that has two optical elements, and the magnetic interference generated by the magnetic elements of the two lens driving modules can be reduced, so as to improve the focus speed and accuracy of the lens in the optical system.

According to some embodiments of the disclosure, the optical system includes a base, a first lens driving module and a second lens driving module. The first lens driving module includes a first lens holder, a first magnet and a first coil. The first lens holder is configured to hold a first optical element. The first coil corresponds to the first magnet, and the first coil is configured to drive the first lens holder to move relative to the base. The second lens driving module includes a second lens holder, a second magnet and a second coil. The second lens holder is configured to hold a second optical element. The second coil corresponds to the second magnet, and the second coil is configured to drive the second lens holder to move relative to the base. The first magnet is disposed between the first and second lens holders, and no other magnet is disposed between the first and second lens holders except the first magnet.

In some embodiments, the first magnet has a long strip-shaped structure and extends along a first direction, and the second magnet has a long strip-shaped structure and extends along a second direction, wherein the first direction is perpendicular to the second direction.

In some embodiments, the first and second lens holders are arranged along the second direction.

In some embodiments, the diameter of the first optical element is greater than the diameter of the second optical element.

In some embodiments, the optical system further includes two second magnets and two second coils, wherein the distance between the two second magnets along the first direction or the distance between the two second coils along the first direction is less than the width of the first lens holder along the first direction.

In some embodiments, a connecting line is defined by connecting the centers of the first and second optical elements, and the position of the first magnet is deviated from the midpoint of the connecting line.

According to another embodiment of the disclosure, an optical system includes a base, a first lens driving module and a second lens driving module. The first lens driving module includes a first lens holder, a first magnet and a first coil. The first lens holder is configured to hold a first optical element. The first coil corresponds to the first magnet, and the first coil is configured to drive the first lens holder to move relative to the base. The second lens driving module includes a second lens holder and a second coil. The second lens holder is configured to hold a second optical element. The second coil corresponds to the first magnet, and the second coil is configured to drive the second lens holder to move relative to the base. The first magnet is disposed between the first and second lens holders, and no other magnet is disposed between the first and second lens holders except the first magnet.

According to another embodiment of the disclosure, an optical system includes a base, a first lens driving module and a second lens driving module. The first lens driving module includes a first lens holder, two first magnets and a first coil. The first lens holder is configured to hold a first optical element. The first coil corresponds to the first magnets, and the first coil is configured to drive the first lens holder to move relative to the base. The second lens driving module includes a second lens holder, a second magnet and a second coil. The second lens holder is configured to hold a second optical element. The second coil corresponds to the second magnet, and the second coil is configured to drive the second lens holder to move relative to the base. The first magnets are disposed between the first and second lens holders, and no other magnet is disposed between the first and second lens holders except the first magnets.

In some embodiments, the first magnets are arranged along a first direction, the first and second lens holders are arranged along a second direction, and the first direction is perpendicular to the second direction.

The invention discloses an optical system including the first lens driving module and the second lens driving module. At least one magnet is disposed on only one position along the X-axis, and the single position is between the first lens holder and the second lens holder. Therefore, it can prevent the magnetic interference resulting from different magnets of the first lens driving module and the second lens driving module.

In some embodiments, the first magnets, the first coils, the second magnet and the second coils are arranged along the second direction, and there is no magnet or coil disposed on the first lens holder and the second lens holder along the first direction. Therefore, the width of the base can be reduced, so as to achieve the purpose of miniaturization.

In some embodiments, the first magnet has the long strip-shaped structure and extends along the first direction, and the second magnet has the long strip-shaped structure and extends along the second direction. Therefore, the length of the base can be reduced because of the structural design, so as to achieve the purpose of miniaturization.

In addition, in some embodiments, the first coil surrounds the periphery of the first lens holder, and it increases the convenience of production because of the structural design.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DETAILED DESCRIPTION OF THE ILLUSTRATIVE EMBODIMENTS

Figure 1:
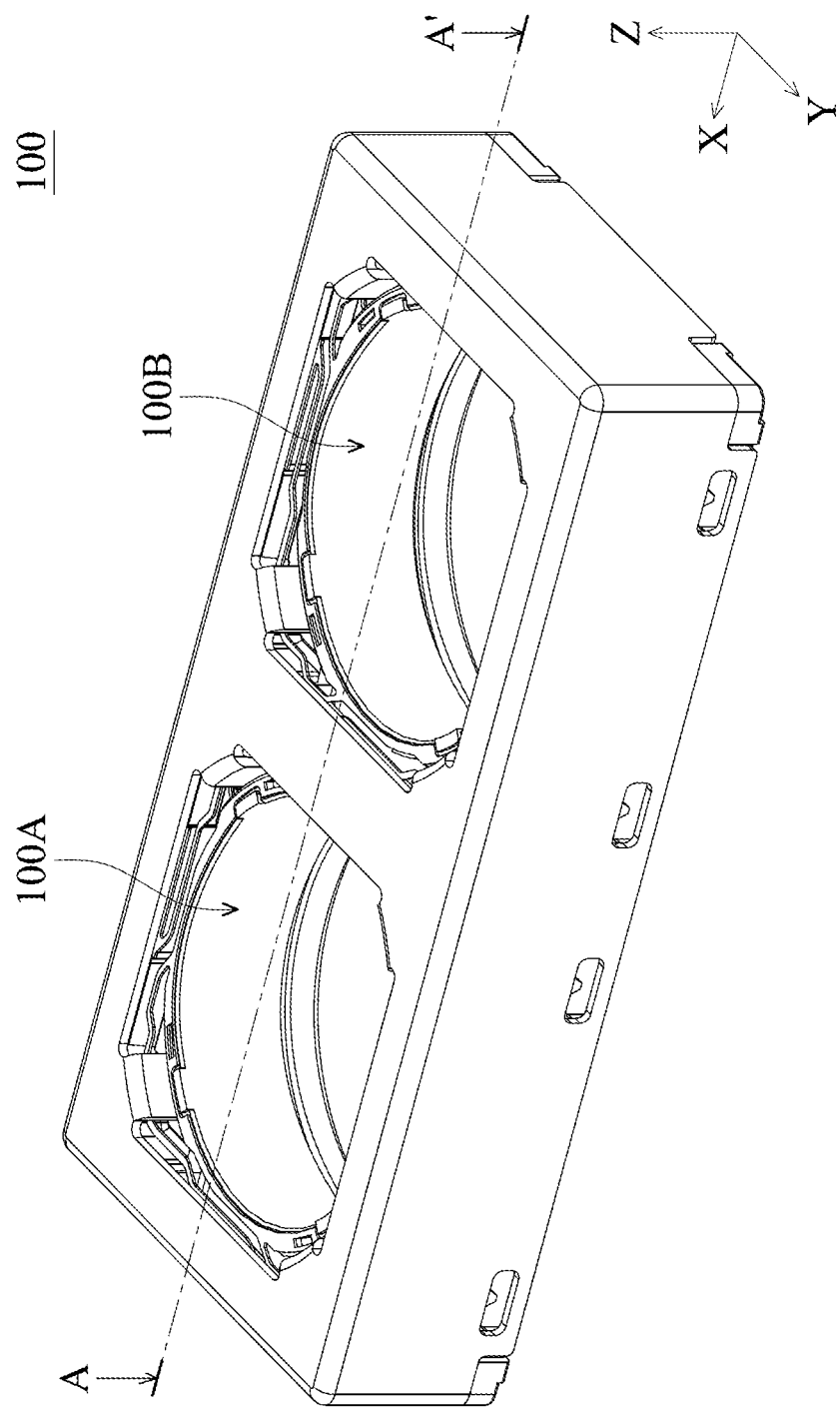
FIG. 1 is a diagram of an optical system according to an embodiment of the disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

Figure 2:
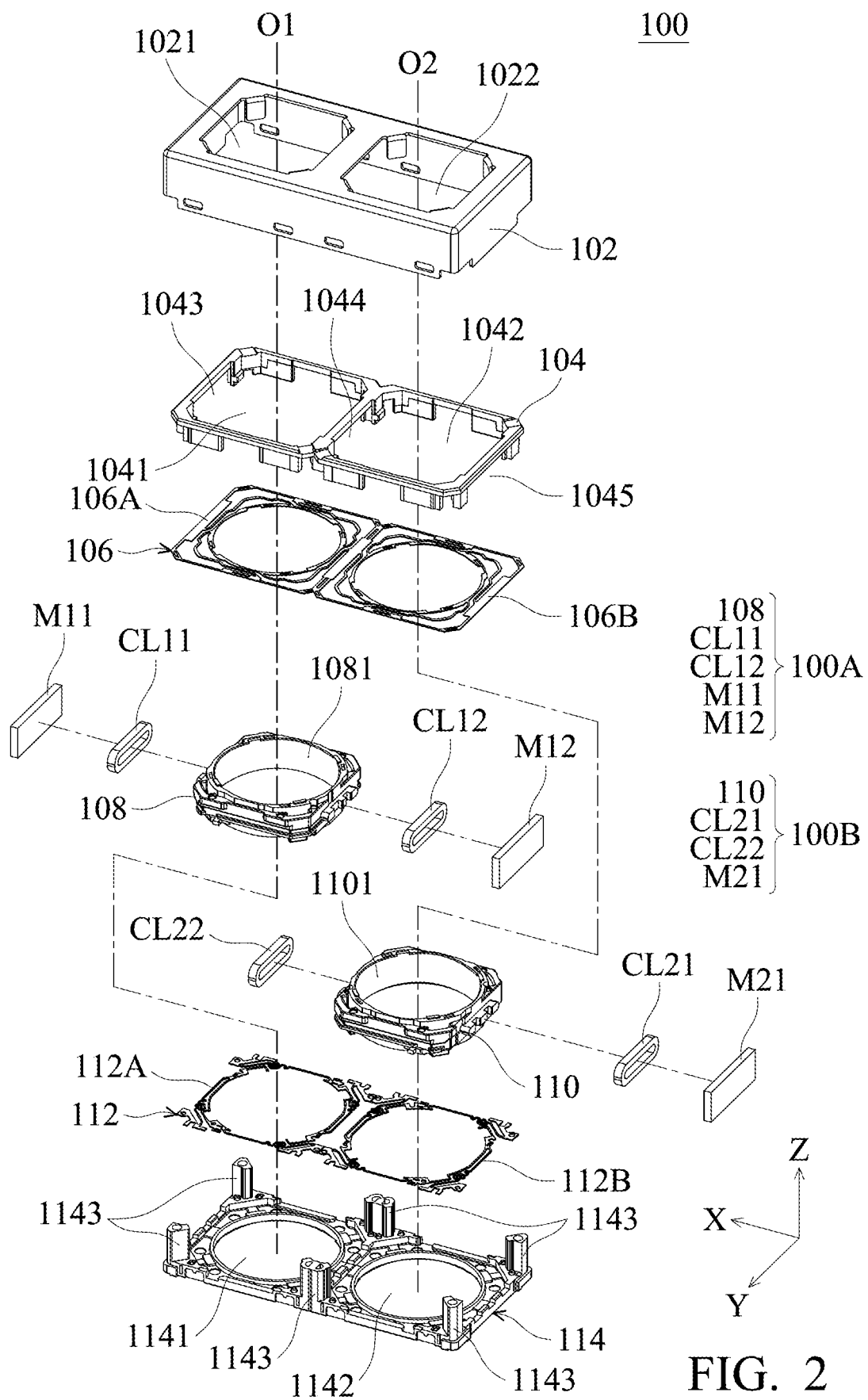
FIG. 2 shows an exploded diagram of the optical system in FIG. 1.
Figure 3:
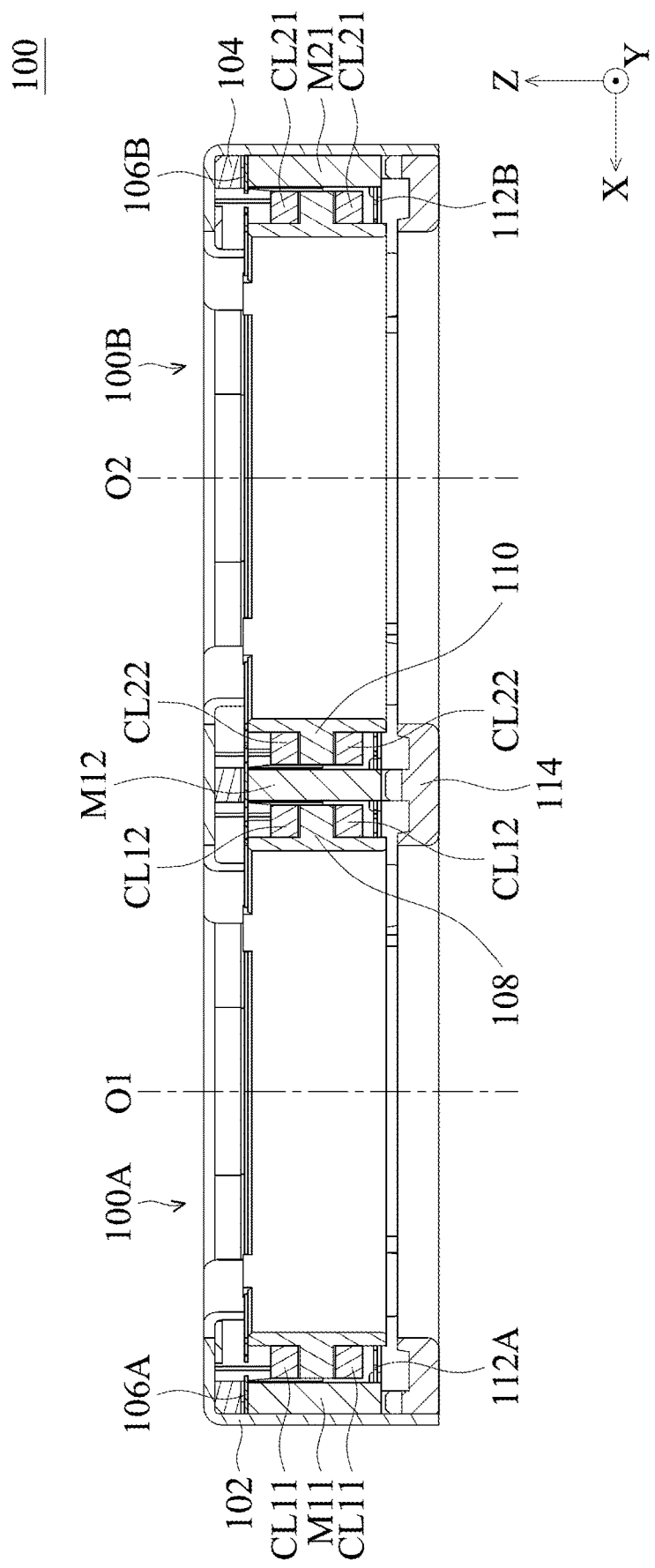
FIG. 3 shows a cross-sectional view along the line A-A' in FIG. 1.

Please refer to FIG. 1 to FIG. 3. FIG. 1 is a diagram of an optical system 100 according to an embodiment of the disclosure. FIG. 2 shows an exploded diagram of the optical system 100 in FIG. 1. FIG. 3 shows a cross-sectional view along the line A-A' in FIG. 1. The optical system 100 can be an image capturing system which has two lens driving modules 2 (a first lens driving module 100A and a second lens driving module 100B) for holding two optical elements (not shown in the figures), and the optical system 100 may be provided in several electronic devices or portable electronic devices for allowing the user to perform the image capturing function. In this embodiment, the two lens driving modules can be voice coil motors (VCM) having the same specification and equipped with an optical image stabilizer (OIS) function, but the invention is not limited thereto. In some embodiments, the two lens driving modules of the optical system 100 may also have different specifications and be equipped with auto-focus (AF) and OIS functions.

As shown in FIG. 1 to FIG. 3, in this embodiment, the optical system 100 mainly includes a top casing 102, a frame 104, an upper spring sheet 106, a first lens holder 108, a first magnet M11, a first magnet M12, a first coil CL11, a first coil CL12, a second lens holder 110, a second magnet M21, a second coil CL21, a second coil CL22, a lower spring sheet 112 and a base 114. The first lens driving module 100A is composed of the first lens holder 108, the first magnet M11, the first magnet M12, the first coil CL11 and the first coil CL12, and the second lens driving module 100B is composed of the second lens holder 110, the second magnet M21, the second coil CL21 and the second coil CL22. The first lens holder 108 and the second lens holder 110 are respectively used for holding a first optical element and a second optical element (not shown in the figures). In addition, the first coil CL11 corresponds to the first magnet M11, the first coil CL12 corresponds to the first magnet M12, the second coil CL22 corresponds to the first magnet M12, and the second coil CL21 corresponds to the second magnet M21.

The top casing 102 has a hollow structure, and can be combined with the base 114. A top casing opening 1021 and a top casing opening 1022 are formed on the top casing 102, and a base opening 1141 and a base opening 1142 are formed on the base 114. The center of the top casing opening 1021 corresponds to an optical axis O1 of the first optical element (not shown in the figures) which is held by the first lens holder 108. The base opening 1141 corresponds to a first image sensing element (now shown in the figures) below the base 114. The center of the top casing opening 1022 corresponds to an optical axis O2 of the second optical element (not shown in the figures) which is held by the second lens holder 110. The base opening 1142 corresponds to a second image sensing element (now shown in the figures) below the base 114. Accordingly, the first lens driving module 100A and the second lens driving module 100B can respectively drive the first optical element and the second optical element to move along the optical axis O1 and optical axis O2 to perform image focusing function.

The frame 104 has a first opening 1041, a second opening 1042 and a plurality of grooves. In this embodiment, the frame 104 has a groove 1043, a groove 1044 and a groove 1045, but the amounts of the grooves are not limited thereto. The first magnet M11 can be correspondingly disposed in the groove 1043, the first magnet M12 can be correspondingly disposed in the groove 1044, and the second magnet M21 can be correspondingly disposed in the groove 1045. In some embodiment, the first magnet M11, the first magnet M12 and the second magnet M21 have long strip-shaped structures.

The first lens holder 108 and the second lens holder 110 respectively have hollow ring structures, and the first lens holder 108 and the second lens holder 110 respectively have a first through hole 1081 and a second through hole 1101. The first through hole 1081 forms a threaded structure (not shown) corresponding to another threaded structure (not shown) on the first optical element, such that the first optical element can be locked in the first through hole 1081. The second through hole 1101 forms a threaded structure (not shown) corresponding to another threaded structure (not shown) on the second optical element, such that the second optical element can be locked in the second through hole 1101. The first coil CL11, the first coil CL12 are disposed on the first lens holder 108, and the second coil CL21 and the second coil CL22 are disposed on the second lens holder 110.

In this embodiment, the first lens holder 108 and the first optical element are disposed in the first opening 1041 and can move relative to the frame 104. The second lens holder 110 and the second optical element are disposed in the second opening 1042 and can move relative to the frame 104. More specifically, the upper spring sheet 106 has a first resilient portion 106A and a second resilient portion 106B, and the lower spring sheet 112 has a third resilient portion 112A and a fourth resilient portion 112B. The first lens holder 108 is connected to the frame 104 by the first resilient portion 106A and the third resilient portion 112A, so that the first lens holder 108 is suspended in the first opening 1041. The second lens holder 110 is connected to the frame 104 by the second resilient portion 106B and the fourth resilient portion 112B, so that the second lens holder 110 is suspended in the second opening 1042. When a current is supplied to the first coil CL11 and the first coil CL12, the first coil CL11 and the first coil CL12 can respectively act with the magnetic fields of the first magnet M11 and the first magnet M12 to generate an electromagnetic force, so as to drive the first lens holder 108 to move relative to the frame 104 along the Z-axis. Similarly, when a current is supplied to the second coil CL21 and the second coil CL22, the second coil CL21 and the second coil CL22 can respectively act with the magnetic fields of the second magnet M21 and the first magnet M12 to generate the electromagnetic force, so as to drive the second lens holder 110 to move relative to the frame 104 along the Z-axis. For example, the first magnet M11, the first magnet M12 and the second magnet M21 can include at least one multipole magnet which is used to electromagnetically act with the corresponding coil to drive the first lens holder 108 and the second lens holder 110 to move along the optical axis O1 and the optical axis O2 respectively, so as to perform image focusing.

It should be understood that the first resilient portion 106A and the second resilient portion 106B are integrally formed, and the third resilient portion 112A and the fourth resilient portion 112B are integrally formed in this embodiment, but they are not limited thereto. For example, the first resilient portion 106A and the second resilient portion 106B can be two spring sheets separate from each other, and the third resilient portion 112A and the fourth resilient portion 112B can be two spring sheets separate from each other.

As shown in FIG. 2, six protruding columns 1143 are formed on the base 114, and the protruding columns 1143 are used for combining the frame 104 with the base 114. The outer peripheral portion of the upper spring sheet 106 is fixed to the protruding columns 1143 and is located between the frame 104 and the base 104 (as shown in FIG. 3). Moreover, the inner peripheral portions of the first resilient portion 106A and the third resilient portion 112A are respectively connected to the upper and lower sides of the first lens holder 108, so that the first lens holder 108 can be suspended in the first opening 1041 of the frame 104. The inner peripheral portions of the second resilient portion 106B and the fourth resilient portion 112B are respectively connected to the upper and lower sides of the second lens holder 110, so that the second lens holder 110 can be suspended in the second opening 1042 of the frame 104.

Please refer to FIG. 3. In the optical system 100, because the first lens driving module 100A is very close to the second lens driving module 100B, if the first magnet and the second magnet are disposed on adjacent sides of the first lens driving module 100A and the second lens driving module 100B at the same time, and then magnetic interference between the adjacent first and second magnets is likely to occur, causing the focus speed and accuracy of the optical elements to be adversely affected. Therefore, only one first magnet M12 is disposed between the first lens holder 108 and the second lens holder 110 in this embodiment, and the first magnet M12 corresponds to the first coil CL12 and the second coil CL21 at the same time, so as to prevent the magnetic interference problem.

Figure 4:
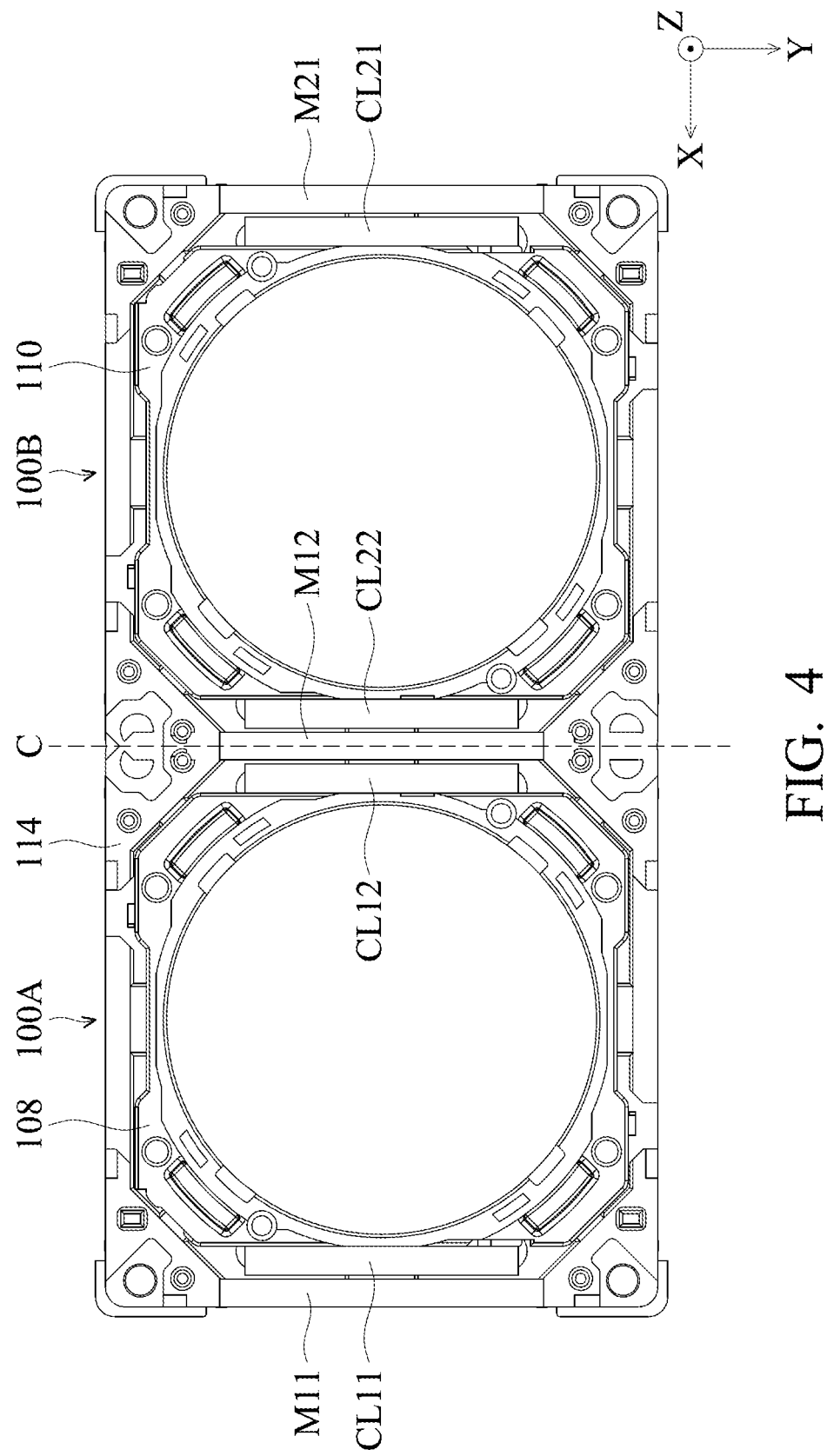
FIG. 4 shows a schematic plane view illustrating the arrangement of the coils and the magnets of the optical system in FIG. 1 according to the embodiment of the disclosure.

FIG. 4 shows a schematic plane view illustrating the arrangement of the coils and the magnets of the optical system 100 in FIG. 1 according to the embodiment of the disclosure. For the sake of simplicity and clarity, this embodiment and the following embodiments illustrate only the first lens driving module 100A, the second lens driving module 100B and the base 114 to show their relative positions. As shown in FIG. 4, in the optical system 100, a connecting line is defined by connecting the centers of the first and second optical elements, and a central line C can be defined by the midpoint of the connecting line. The central line C is parallel to the Y-axis (a first direction) and is located between the first lens holder 108 and the second lens holder 110. It is noted that only the first magnet M12 is disposed between the first lens holder 108 and the second lens holder 110, and no other magnet is disposed between the first lens holder 108 and the second lens holder 110 except the first magnet M12. The first magnet M12 is disposed along the central line C.

Furthermore, the first lens holder 108 and the second lens holder 110 are arranged along the X-axis (a second direction), and the first direction is perpendicular to the second direction. As shown in FIG. 4, the first coil CL12 and the second coil CL22 are located on two opposite sides of the first magnet M12. The first magnet M11 and the second magnet M21 are located on two opposite sides of the base 114, and the corresponding first coil CL11 and the corresponding second coil CL21 are also located on the two opposite sides of the base 114. That is, the magnets and the coils of the first lens driving module 100A (the first magnets M11, M12 and the first coils CL11, CL12) and the magnet and the coils of the second lens driving module 100B (the second coils CL22, CL21 and the second magnet M21) are only arranged along the X-axis (the second direction).

Based on the above structural design shown in FIG. 4, the magnetic interference resulting from the first lens driving module 100A and the second lens driving module 100B can be prevented, so as to ensure the focus speed and positioning accuracy of the optical elements. In addition, the magnets and the coils of the first lens driving module 100A and the second lens driving module 100B are only arranged along the X-axis, which means that there is no magnet or coil disposed on the longitudinal side of the base 114, so that the width of the base 114 along the Y-axis can be reduced, so as to achieve the purpose of miniaturization of the optical system 100.

In addition, it should be noted that another embodiment can only include the first coil CL12, the first magnet M12, and the second coil CL22. When the first coil CL12 is supplied with electricity, the first coil CL12 electromagnetically acts with the first magnet M12 to generate the electromagnetic force to drive the first lens holder 108 to move relative to the base 114 along the Z-axis, so as to perform the auto-focus function. When the second coil CL22 is supplied with electricity, the second coil CL22 also electromagnetically acts with the first magnet M12 to generate the electromagnetic force to drive the second lens holder 110 to move relative to the base 114 along the Z-axis, so as to perform the auto-focus function of the dual optical elements.

Figure 5:
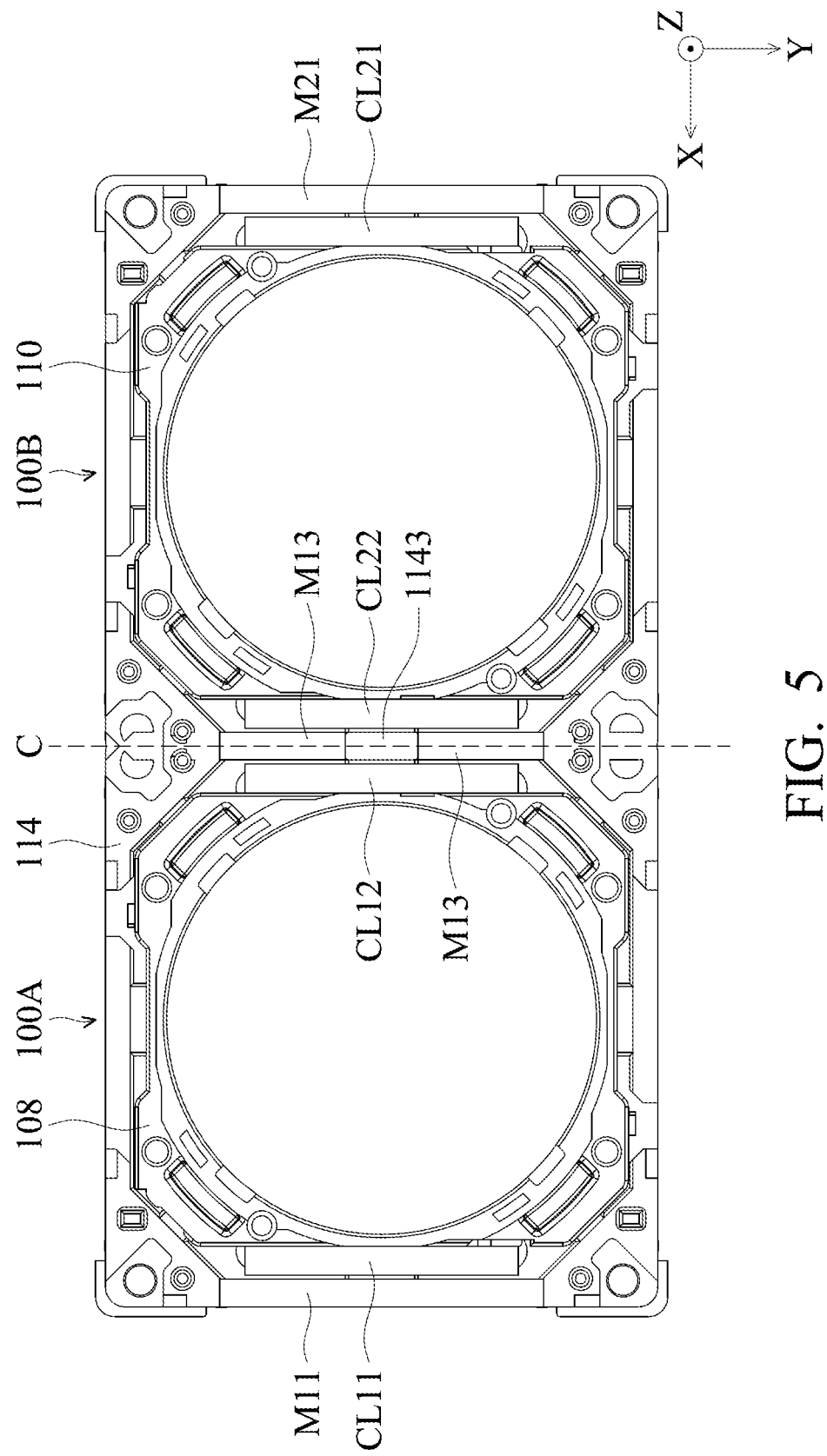
FIG. 5 shows a schematic plane view illustrating the arrangement of the coils and the magnets of the first lens driving module and the second lens driving module according to another embodiment of the disclosure.

FIG. 5 shows a schematic plane view illustrating the arrangement of the coils and the magnets of the first lens driving module 100A and the second lens driving module 100B according to another embodiment of the disclosure. In FIG. 5, the lens driving modules on the left side and the right side are respectively the first lens driving module 100A and the second lens driving module 100B. As shown in FIG. 5, the first lens holder 108 and the second lens holder 110 are arranged along the X-axis (the second direction). In addition, in this embodiment, only two first magnets M13 shown in FIG. 5 are disposed between the first lens holder 108 and the second lens holder 110, and no other magnet is disposed between the first lens holder 108 and the second lens holder 110 except the first magnets M13. The first magnets M13 are spaced apart from each other and are disposed along the Y-axis (the first direction). In this embodiment, the first magnets M13 are arranged along the central line C, and the length of each of the first magnets M13 is shorter than the length of the first magnet M12 or the second magnet M21.

Based on the above structural design shown in FIG. 5, because only the two first magnets M13 arranged along the Y-axis are disposed between the first lens holder 108 and the second lens holder 110, the magnetic interference problem can be prevented. The first coil CL12 and the second coil CL22 respectively electromagnetically act with the first magnets M13 to generate the electromagnetic force, so as to respectively drive the first lens holder 108 and the second lens holder 110 to move along the Z-axis. It is noted that another one protruding column 1143 can be formed on the base 114, and the protruding column 1143 is located between the first lens holder 108 and the second lens holder 110 and is located between the first magnets M13, so as to facilitate positioning the first magnets M13. For example, the first magnets M13 can be stably fixed to the protruding column 1143 by glue or in a manner of engagement. As a result, when the optical system 100 is physically applied by an external shock, this design of the optical system 100 can withstand the external shock and can prevent the first magnets M13 from separating from their original positions.

Figure 6:
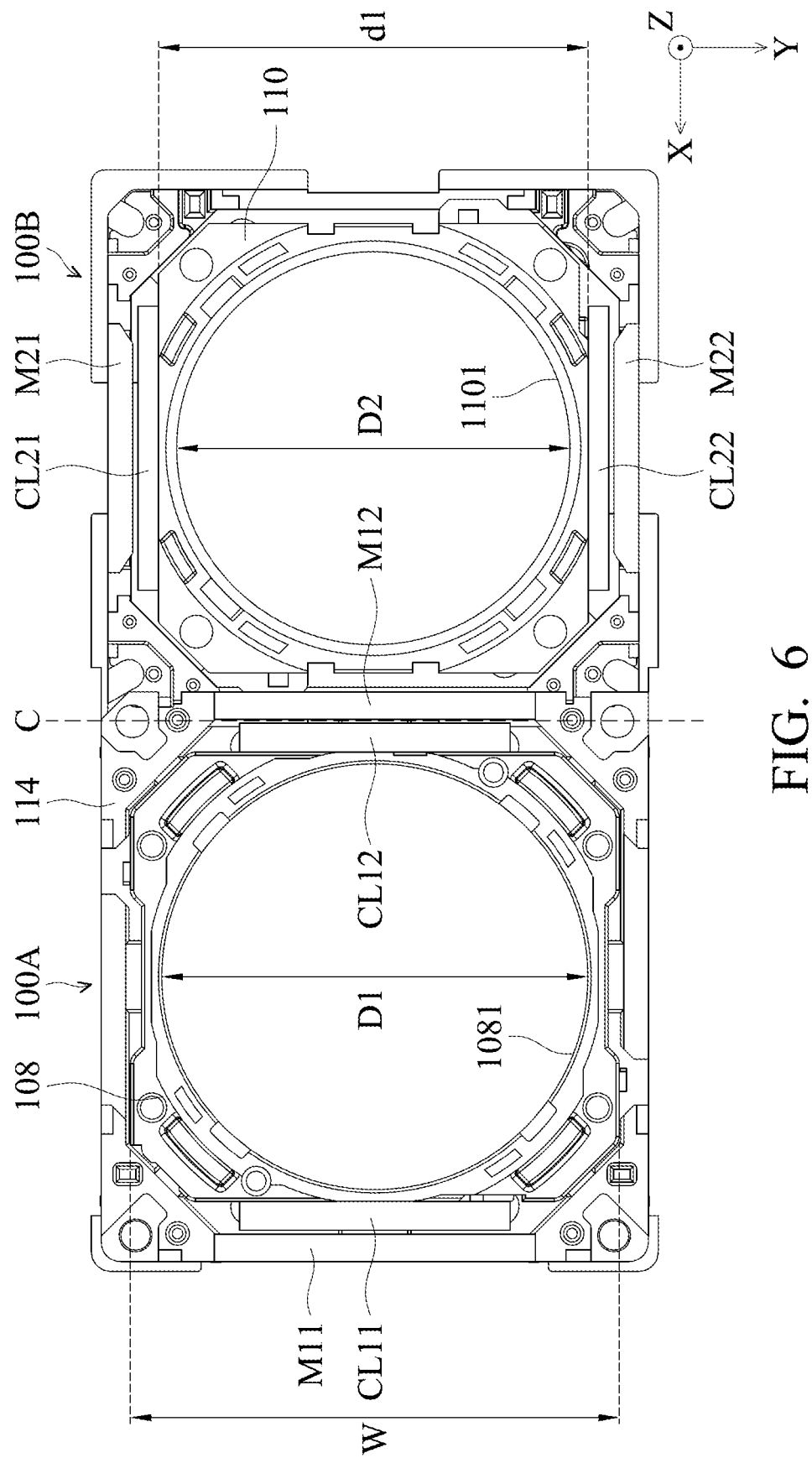
FIG. 6 shows a schematic plane view illustrating the arrangement of the coils and the magnets of the first lens driving module and the second lens driving module according to another embodiment of the disclosure.

Please refer to FIG. 6, which shows a schematic plane view illustrating the arrangement of the coils and the magnets of the first lens driving module 100A and the second lens driving module 100B according to another embodiment of the disclosure. In FIG. 6, the lens driving modules on the left side and the right side are respectively the first lens driving module 100A and the second lens driving module 100B. As shown in FIG. 6, the first lens driving module 100A includes the first lens holder 108, the first magnet M11, the first coil CL11, the first coil CL12, and the first magnet M12. The second lens driving module 100B includes the second lens holder 110, the second magnet M21, the second coil CL21, a second magnet M22, and the second coil CL22. The first magnet M11 and the first magnet M12 have long strip-shaped structures, and the first magnet M11 and the first magnet M12 extend along the Y-axis (the first direction). The second magnet M21 and the second magnet M22 have long strip-shaped structures, and the second magnet M21 and the second magnet M22 extend along the X-axis (the second direction).

It should be noted that the first lens holder 108 and the second lens holder 110 are arranged along the X-axis (the second direction), and only the first magnet M12 is disposed between the first lens holder 108 and the second lens holder 110. No other magnet is disposed between the first lens holder 108 and the second lens holder 110 except the first magnet M12. The position of the first magnet M12 is deviated from the central line C. For example, in this embodiment, the connecting line defined by the centers of the first and second optical elements, and the central line C is defined by the midpoint of the connecting line. The position of the first magnet M12 is deviated from the central line C and is located on the right side of the central line C. In addition, the first magnet M11 and the first magnet M12 are located on opposite sides of the first lens holder 108, and the first coil CL11 and the first coil CL12 are also located on the opposite sides of the first lens holder 108. When the first coil CL12 and the first coil CL12 are supplied with electricity, the first coil CL11 and the first coil CL12 can respectively electromagnetically act with the corresponding first magnet M11 and the corresponding first magnet M12 to generate the electromagnetic force, so as to drive the first lens holder 108 and the first optical element to move relative to the base 114.

Furthermore, as shown in FIG. 6, the second magnet M21 and the second magnet M22 are located on opposite sides of the second lens holder 110, and the second coil CL21 and the second coil CL22 are also located on the opposite sides of the second lens holder 110. It should be noted that the diameter D2 of the second through hole 1101 of the second lens holder 110 is less than the diameter D1 of the first through hole 1081 of the first lens holder 108. That is, the diameter of the first optical element is greater than the diameter of the second optical element. Besides, the distance dl between the second coil CL21 and the second coil CL22 along the Y-axis (the second direction) is less than the width W of the first lens holder 108 along the Y-axis (the second direction). In addition, the distance between the second magnet M21 and the second magnet M22 along the Y-axis can be also less than the width W along the Y-axis. For example, the second coil CL21 and the second coil CL22 overlap the first lens holder 108 when viewed along the X-axis (the first direction), and the second magnet M21 and the second magnet M22 partially overlap the first lens holder

108 when viewed along the X-axis (the first direction). When the second coil CL21 and the second coil CL22 are supplied with electricity, the second coil CL21 and the second coil CL22 can respectively electromagnetically act with the corresponding second magnet M21 and the corresponding second magnet M22 to generate the electromagnetic force, so as to drive the second lens holder 110 and the second optical element to move relative to the base 114.

It should be noted that the magnets and the coils of the first lens driving module 100A (the first magnets M11, M12 and the first coils CL11, CL12) are only arranged along the X-axis, and the magnets and the coils of the second lens driving module 100B (the second magnets M21, M22 and the second coils CL21, CL22) are only arranged along the Y-axis. As a result, the connecting line defined by connecting the centers of the first magnet M11 and the first magnet M12 is not parallel to the connecting line defined by connecting the centers of the second magnet M21 and the second magnet M22. In this embodiment, the connecting line of the first magnet M11 and the first magnet M12 extends across the connecting line of the second magnet M21 and the second magnet M22, and the connecting line of the first magnet M11 and the first magnet M12 is perpendicular to the connecting line of the second magnet M21 and the second magnet M22.

Because the magnets and the coils of the first lens driving module 100A are only arranged along the X-axis, and the magnets and the coils of the second lens driving module 100B are only arranged along the Y-axis, the problem of magnetic interference resulting from the first lens driving module 100A and the second lens driving module 100B can be prevented, and the length of the base 114 along the X-axis and the width of the base 114 along the Y-axis can be reduced, so as to achieve the purpose of miniaturization of the optical system 100.

Figure 7:
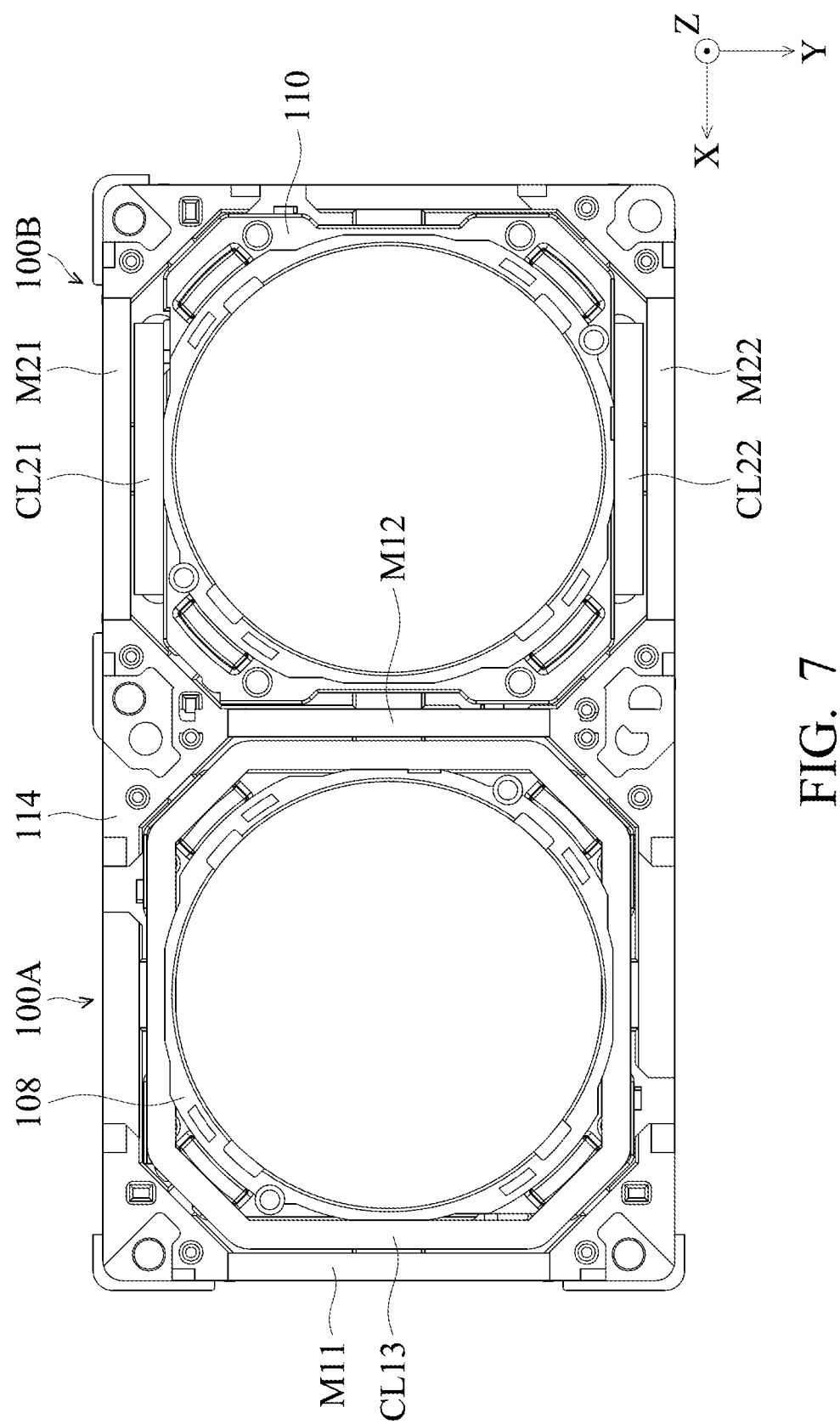
FIG. 7 shows a schematic plane view illustrating the arrangement of the coils and the magnets of the first lens driving module and the second lens driving module according to another embodiment of the disclosure.

Please refer to FIG. 7, which shows a schematic plane view illustrating the arrangement of the coils and the magnets of the first lens driving module 100A and the second lens driving module 100B according to another embodiment of the disclosure. In FIG. 7, the lens driving modules on the left side and the right side are respectively the first lens driving module 100A and the second lens driving module 100B. The difference between this embodiment and the embodiment in FIG. 6 is that the first lens driving module 100A includes a first coil CL13, which surrounds the periphery of the first lens holder 108 and corresponds the first magnet M11 and the first magnet M12. It increases the convenience of production due to the design of the first coil CL13 surrounding the periphery of the first lens holder 108

Similarly, the magnets and the coil of the first lens driving module 100A (the first magnets M11, M12 and the first coil CL13) are only arranged along the X-axis, and the magnets and the coils of the second lens driving module 100B (the second magnets M21, M22 and the second coils CL21, CL22) are only arranged along the Y-axis. As a result, the connecting line defined by the centers of the first magnet M11 and the first magnet M12 is not parallel to the connecting line defined by the centers of the second magnet M21 and the second magnet M22. In this embodiment, the connecting line of the first magnet M11 and the first magnet M12 extends across the connecting line of the second magnet M21 and the second magnet M22, and the connecting line of the first magnet M11 and the first magnet M12 is perpendicular to the connecting line of the second magnet M21 and the second magnet M22.

Because the second magnet M21 and the second magnet M22 are not close to the first magnet M12, the magnetic interference problem between those magnets can be also prevented, and the length of the base 114 along the X-axis can be reduced due to the structural design of this embodiment, so as to achieve the purpose of mechanical miniaturization.

In conclusion, the invention provides the optical system 100 including the first lens driving module 100A and the second lens driving module 100B. At least one magnet is disposed on only one position along the X-axis, and the single position is between the first lens holder 108 and the second lens holder 110. Therefore, it can prevent the magnetic interference resulting from different magnets of the first lens driving module 100A and the second lens driving module 100B.

In some embodiments, the first magnets, the first coils, the second magnet and the second coils are arranged along the X-axis, and there is no magnet or coil disposed on the first lens holder 108 and the second lens holder 110 along the Y-axis. Therefore, the width of the base 114 can be reduced, so as to achieve the purpose of miniaturization.

In some embodiments, the first magnet has the long strip-shaped structure and extends along the Y-axis (the first direction), and the second magnet has the long strip-shaped structure and extends along the X-axis (the second direction). Therefore, the length of the base 114 can be reduced because of this structural design, so as to achieve the purpose of miniaturization.

In addition, in some embodiments, the first coil surrounds the periphery of the first lens holder 108, and it increases the convenience of production because of the structural design.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical system with a first direction and a second direction perpendicular to each other, comprising:
 a fixed part;
 a first optical element driving module comprising:
  a first holder, having a first receiving space for holding a first optical element with a first optical axis;
  a first driving assembly, driving the first holder to move relative to the fixed part, comprising:
   a first magnet with a rectangular structure, extending along the second direction; and
   a first coil, corresponding to the first magnet;
 a second optical element driving module, comprising:
  a second holder, having a second receiving space for holding a second optical element with a second optical axis;

a second driving assembly, driving the second holder to move relative to the fixed part;

wherein in a direction that is perpendicular to the first optical axis, a maximum size of the first receiving space is different from a maximum size of the second receiving space.

2. The optical system as claimed in claim 1, wherein in the direction that is perpendicular to the first optical axis, the maximum size of the first receiving space is larger than the maximum size of the second receiving space.

3. The optical system as claimed in claim 1, wherein the first holder and the second holder are arranged along the second direction.

4. The optical system as claimed in claim 1, further comprising another first magnet, wherein the two first magnets are disposed at opposite sides of the first optical element driving module.

5. The optical system as claimed in claim 4, wherein the two first magnets are arranged along the first direction.

6. The optical system as claimed in claim 1, wherein the second driving assembly further comprises a second magnet and a second coil, and the second coil corresponds to the second magnet.

7. The optical system as claimed in claim 6, wherein the second magnet has a rectangular structure and extends along the first direction or the second direction.

8. The optical system as claimed in claim 1, wherein the second driving assembly further comprises two second magnets and two second coils, a distance between the two second magnets along the first direction or a distance between the two second coils along the first direction is less than a width of the first holder along the first direction.

9. The optical system as claimed in claim 1, further comprising an upper spring sheet and a lower spring sheet, wherein the first holder and the second holder are disposed between the upper spring sheet and the lower spring sheet.

10. The optical system as claimed in claim 9, wherein the upper spring sheet or the lower spring sheet is integrally formed in one piece.

11. An optical system with a first direction and a second direction perpendicular to each other, comprising:
a fixed part;
a first optical element driving module, comprising:
a first holder, having a first receiving space for holding a first optical element with a first optical axis;
a first driving assembly, driving the first holder to move relative to the fixed part, comprising:
a first magnet; and
a first coil, corresponding to the first magnet;
a second optical element driving module, comprising:
a second holder, having a second receiving space for holding a second optical element with a second optical axis;
a second driving assembly, driving the second holder to move relative to the fixed part;
wherein in a direction that is perpendicular to the first optical axis, a maximum size of the first receiving space is different from a maximum size of the second receiving space;
wherein a central line is defined between the first optical element driving module and the second optical element driving module;
wherein the first optical element driving module comprises a first side, the second optical element driving module comprises a second side, the first side is adjacent to the second side, and the central line is located between the first side and the second side, wherein no first magnet is disposed at the first side.

12. The optical system as claimed in claim 11, wherein in the direction that is perpendicular to the first optical axis, the maximum size of the first receiving space is larger than the maximum size of the second receiving space.

13. The optical system as claimed in claim 11, wherein the first holder and the second holder are arranged along the second direction.

14. The optical system as claimed in claim 11, further comprising another first magnet, wherein the two first magnets have rectangular structures and extend along the second direction.

15. The optical system as claimed in claim 14, wherein the two first magnets are disposed at opposite sides of the first optical element driving module and are arranged along the first direction.

16. The optical system as claimed in claim 11, wherein the second driving assembly further comprises a second magnet and a second coil, and the second coil corresponds to the second magnet.

17. The optical system as claimed in claim 16, wherein the second magnet has a rectangular structure and extends along the first direction or the second direction.

18. The optical system as claimed in claim 11, wherein the second driving assembly further comprises two second magnets and two second coils, a distance between the two second magnets along the first direction or a distance between the two second coils along the first direction is less than a width of the first holder along the first direction.

19. The optical system as claimed in claim 11, wherein the first coil surrounds a periphery of the first holder.

20. An optical system with a first direction and a second direction perpendicular to each other, comprising:
a fixed pan;
a first optical element driving module, comprising:
a first holder, having a first receiving space for holding a first optical element with a first optical axis, wherein the first optical axis, the first direction, and the second direction are perpendicular to each other;
a first driving assembly driving the first holder to move relative to the fixed part, comprising:
two first magnets, arranged along the first direction, wherein the two first magnets have rectangular structures and extend along the second direction; and
a first coil, corresponding to the first magnet;
a second optical element driving module, comprising:
a second holder, having a second receiving space for holding a second optical element with a second optical axis;
a second driving assembly, driving the second holder to move relative to the fixed part;
wherein in a direction that is perpendicular to the first optical axis, a size of the first receiving space is larger than a size of the second receiving space;
wherein no magnet is disposed at opposite sides of the first optical element driving module along the second direction.

* * * * *